Dec. 15, 1942. O. H. DE FRIES 2,304,780
VEHICLE SPRING
Filed March 26, 1941 2 Sheets-Sheet 1
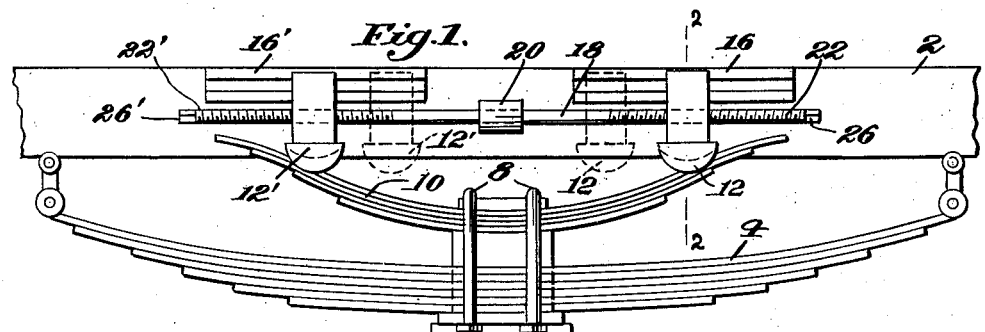
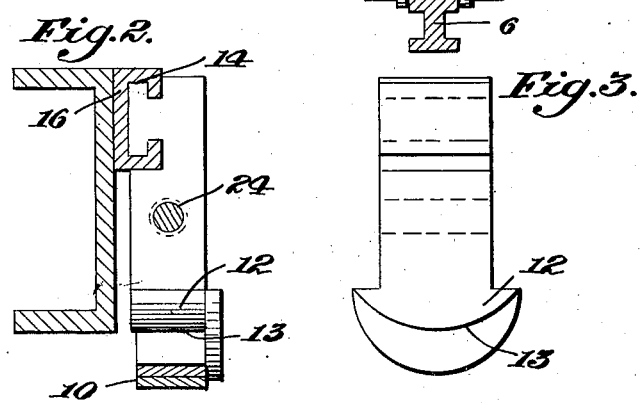
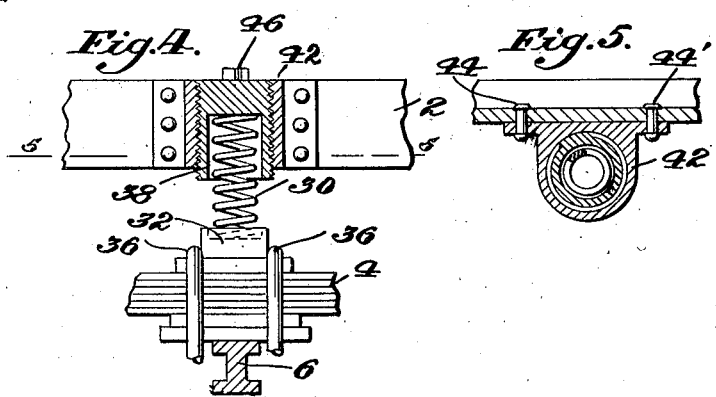
Inventor:
Otto H. de Fries
J Wesley Everett
Att'y.

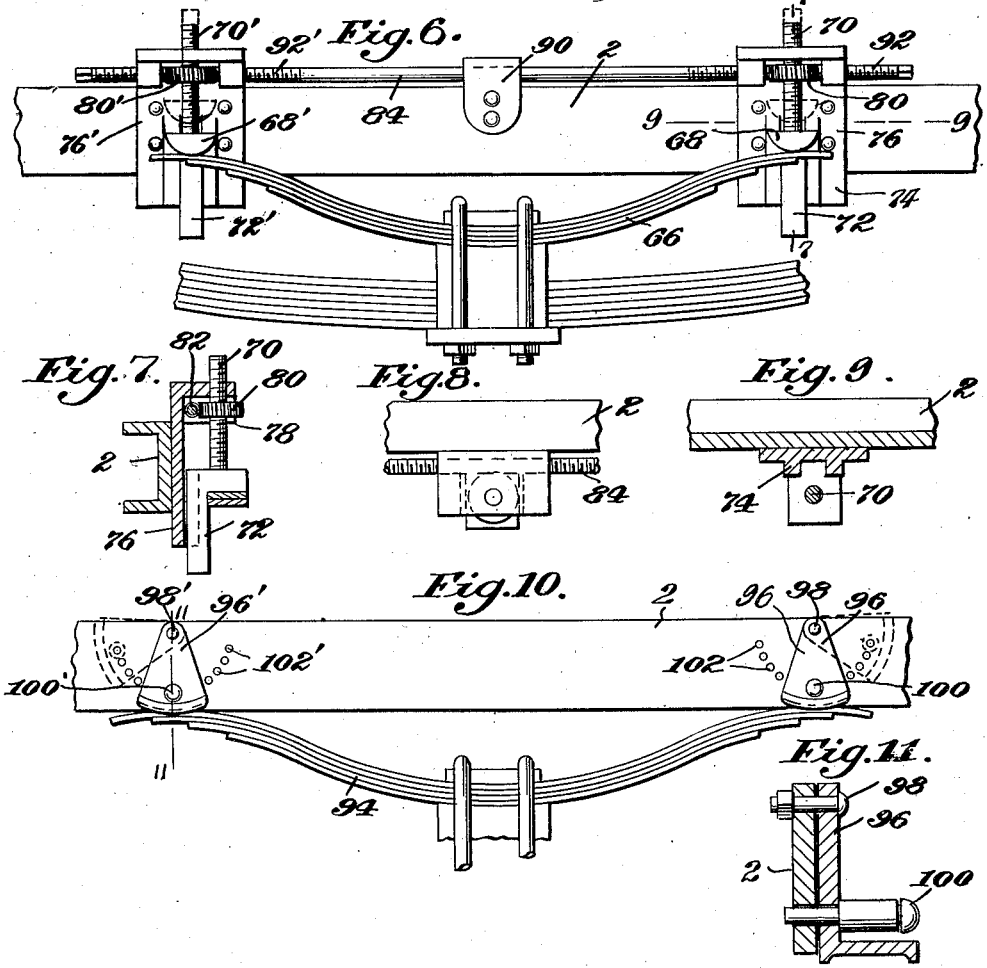

Patented Dec. 15, 1942

2,304,780

UNITED STATES PATENT OFFICE 2,304,780

VEHICLE SPRING

Otto H. de Fries, Towson, Md.

Application March 26, 1941, Serial No. 385,353

2 Claims. (Cl. 267—45)

The present invention relates to vehicle springs and more particularly to the type known as overload or helper springs.

The location, functions, and operations of the several conventional vehicle springs are well known. The overload or helper spring, as it is called, derives its name from its function, that is, when the master spring has been compressed to a certain point, the helper spring is so arranged that it will take over a proportionate part of the load and prevent the master spring from strain, or reaching a point where there is comparatively no springing action.

The helper spring is usually rigidly secured either to the frame of the vehicle or to the axle, and suitable brackets positioned opposite the end portions to contact the same after the master spring has been partly depressed.

This arrangement operates satisfactorily when the load is sufficient to give proper tension to both the master and overload springs. When the load is comparatively light, that is, when the load is such that the master spring has sufficient resiliency to maintain the load without the help of the overload spring, the overload spring will act to limit the movement of the master spring. This is objectional in that under certain loads the master spring is restricted to comparatively little springing action.

One object of the present invention is to provide an overload spring that may be capable of variable adjustments, for increasing or decreasing its tension.

Another object being to provide means for increasing or decreasing the distance of the travel of the master spring by adjusting the supporting elements of the helper spring.

Still another object being to provide means for relieving the helper spring entirely of any action.

Further objects of the invention will appear from the following specifications taken in connection with the drawings, which form a part of this application and in which:

Fig. 1 is a fragmentary view in elevation of a vehicle spring assembly, showing one form of the invention.

Fig. 2 is an enlarged view of one of the adjustable supporting members as shown in Fig. 1, taken along the line 2—2, Fig. 1.

Fig. 3 shows the member 12 in elevation, looking toward the inner side.

Fig. 4 shows another form of the invention, in which adjustable supporting means are provided for a coil type helper spring.

Fig. 5 is a section on the line 5—5 of Fig. 4 showing a cross-section of the adjustable supporting housing means of Fig. 4.

Fig. 6 shows a spring assembly having vertically adjustable supporting brackets secured to the frame member.

Fig. 7 is a section on the line 7—7 of Fig. 6.

Fig. 8 is a top plan view of the adjustable supporting bracket shown in Fig. 6 looking downwardly.

Fig. 9 is a section on the line 9—9 of Fig. 6.

Fig. 10 shows a modified form of the invention having the supporting brackets so arranged that they may be removed from supporting position by rotating them about a fixed pivot.

Fig. 11 is a section on line 11—11 of Fig. 10.

The invention therefore as generally applied to vehicles, trucks, or the like, having a spring member located between the axle and its frame and a secondary spring member, sometimes known as an overload or helper spring, is shown in several modified forms in detail as follows:

One form of the invention, as shown in Fig. 1, discloses a spring assembly in elevation and a portion of the vehicle frame 2. The frame 2 is supported by the master or primary spring 4, which is shown in compressed position secured to the axle member 6 by a clamping means 8. Located between the axle 6 and the frame 2 is a secondary spring 10, generally known as an overload or helper spring. The effect of this secondary spring is to relieve the master spring of a proportionate part of the load, when the master spring has yielded to a predetermined degree. The invention as shown in this form consists in providing longitudinal adjustable supporting members 12 and 12', which are slidably received within the slotted portions 14, within the members 16, and 16' which are rigidly secured to the frame 2. An operating member 18 is provided for operating the members 12 and 12'. The member 18 is rotatably received within a bearing 20, which is secured to the frame 2, the bearing 20 having means therein for retaining the member 18 in position relative to the frame 2. The member 18 is provided with right and left threads 22 and 22' adjacent its end portions. The members 12 and 12' are provided with internally threaded apertures 24, for receiving the threaded end portions of the operating member 18. The member 18 is also provided at its extreme ends 26 and 26' with means for attaching thereto an operating member for rotating the member 18.

When it is desirable to use the overload or helper spring the members 12 and 12' may be moved outwardly along the slotted members 16 and 16' by rotating the member 18 until the members 12 and 12' have reached the outer extremities of the spring 10. By rotating the member 18 in the opposite direction, the members 12 and 12' may be moved inwardly, as shown by the dotted lines, releasing the tension on the helper spring and leaving all the springing action to the master spring.

Fig. 4 discloses another form of the invention comprising a coil spring 30, which has its bottom portion secured within a base block 32 carried by the axle 6 and is shown positioned upon the upper side of the master or primary spring 4 by the clamping means 36. The upper end of the spring is retained within a cylinder 38. This member is externally threaded and is receivable within a threaded housing 42. The housing 42 in turn is rigidly secured to the frame 2 by the rivets 44 and 44'.

The cylinder 38 is provided at its top portion with a boss or projection 46, to which an operating element may be applied for moving the cylinder along the vertical axis of the spring within the housing by rotating the same.

Fig. 6 shows a form of the invention in which the outer ends of the helper spring are supported by vertically adjustable supporting members. The helper spring is assembled to the axle similar to that shown in Fig. 1. Positioned opposite the bearing portions of the ends of the helper spring 66 are vertical adjustable supporting members 68 and 68'. These members are provided with threaded members 70 and 70' extending upwardly and a lower portion 72 and 72' which are slidable within a guide 74 (best shown in Fig. 9) within the members 76 and 76'. The members are secured to the frame of the vehicle by any suitable means and are provided at their upper ends with suitable bearings 78 for supporting gears 80 and 80'. The members 76 and 76' are provided with bearings 82 (see Fig. 7) for receiving an operating member 84 for operating the gears.

The operating member 84 is retained in position by a bearing 90 which is securely held to the frame 2. The end portions 92 and 92' are threaded and adapted to mesh with the gears 80 and 80'. By this arrangement of moving parts, the supporting members 68 and 68' may be adjusted downwardly to increase or upwardly as shown by the dotted lines for decreasing the tension of the overload spring member.

In Fig. 10 a similar structure is shown for a helper spring. The spring 94 is supported at its end portions by supporting brackets 96 and 96'.

The brackets are adapted to swing freely about the pins 98 and 98' and are provided with a spring pin 100 and 100', which may be withdrawn and moved about a radius to engage a plurality of apertures 102 and 102'. When the assistance of the helper spring is desired the members 96 and 96' are moved to vertical position, bringing the bearing surface of the member 96 and 96' in contact with the ends of the spring member 94, and when the spring is to be relieved, the brackets are moved about the pivot 98, as shown by the dotted line, until the bearing surface is out of contact with the spring member.

The present invention is particularly adapted to vehicles in which there is a considerable difference in loads and will be appreciated by those who are familiar with the disadvantages of the conventional type of helper spring now in use. When it is necessary under heavy loads to use the helper spring, it can easily and readily be brought into play. When the load is light and of perishable and destructible nature the tension of the overload spring may be relieved or may be released of duty altogether and allow the master spring whatever action the circumstances may require.

While I have illustrated and described my invention, I do not wish to be limited to the particular disclosure and description of use as the scope of the invention is best defined in the following claims:

1. The combination with a vehicle frame, an axle beneath said frame, a primary spring carried by said axle and linked to the frame forwardly and rearwardly of the axle, of a secondary spring carried by the axle above the primary spring, said secondary spring having its ends curving upwardly forwardly and rearwardly of the axle and terminating adjacent the frame, adjustable shoes carried by the frame and movable into and out of engagement with the ends of the secondary spring upon flexing of the primary spring, said shoes being longitudinally movable on the frame, the ends of the secondary spring terminating above the spring engaging portions of the shoes whereby the shoes will engage the curved ends of the secondary spring when they are adjusted outwardly.

2. A device as set forth in claim 1 wherein the shoes are slidably mounted on the frames and a rotatable right and left hand threaded shaft connecting said shoes and forming means for simultaneously adjusting the shoes inwardly and outwardly in relation to the outer ends of the secondary spring.

OTTO H. DE FRIES.